United States Patent [19]
Trytko

[11] Patent Number: 5,305,108
[45] Date of Patent: Apr. 19, 1994

[54] SWITCHER MIXER PRIORITY ARCHITECTURE

[75] Inventor: David E. Trytko, Foster City, Calif.

[73] Assignee: Ampex Systems Corporation, Redwood City, Calif.

[21] Appl. No.: 908,204

[22] Filed: Jul. 2, 1992

[51] Int. Cl.⁵ ............................................. H04N 5/262
[52] U.S. Cl. ................................... 348/594; 348/595; 348/584
[58] Field of Search ............... 358/183, 182, 185, 181, 358/22; H04N 5/262, 5/265, 5/272

[56] References Cited

U.S. PATENT DOCUMENTS

| | | |
|---|---|---|
| 4,360,831 | 11/1982 | Kellar . |
| 4,611,233 | 9/1986 | Tanno . |
| 4,710,761 | 12/1987 | Kapur et al. . |
| 4,758,892 | 7/1988 | Bloomfield . |
| 4,774,583 | 9/1988 | Kellar et al. . |
| 4,791,489 | 12/1988 | Polatnick ................. 358/183 X |
| 4,823,183 | 4/1989 | Jackson et al. . |
| 4,853,784 | 8/1989 | Abt et al. . |
| 4,875,034 | 10/1989 | Brokenshire . |
| 4,963,977 | 10/1990 | Jackson et al. . |
| 5,016,105 | 5/1991 | Muller et al. . |
| 5,027,213 | 6/1991 | Kamin . |
| 5,115,314 | 5/1992 | Ross et al. ................. 358/182 X |
| 5,231,499 | 7/1993 | Trytko . |

FOREIGN PATENT DOCUMENTS 0160549 11/1985 European Pat. Off. .
0327333 8/1990 European Pat. Off. .
2640838 6/1990 France .

*Primary Examiner*—Victor R. Kostak
*Attorney, Agent, or Firm*—Richard J. Roddy

[57] ABSTRACT

A switcher mixer architecture creates special effects such as a dissolve or a wipe from one priority structure of the elements of an image scene to a completely different prioritized ordering of those same or even other elements that comprise the same or a different image scene. The special effect can be thought of as a "priority transition" in the sense that the priority of a set of input image signals can be transitioned from that of a "from" image to that of a "to" image. The switcher mixer architecture eliminates a soft border artifact from the special effect by allowing a border to be given its own priority as though the border were a separate image input as well as to couple together (1) a source, or "from," image having one or more elements; (2) a destination, or "to," image having one or more elements, which could be the same or different than the "from" image elements; and (3) a border image for separating the source image and the destination image in an image display.

10 Claims, 5 Drawing Sheets

SWITCHER MIXER PRIORITY ARCHITECTURE

BACKGROUND OF THE INVENTION

1. Field of the Invention

This invention relates to a mixer priority architecture and, more particularly, to a mixer priority architecture which is usable with image signal processors to eliminate a soft border transition artifact so commonly encountered with known image processors.

2. Description of Related Art

Known image processors of the type capable of switching image signals are sometimes called "switchers" in the art. For example, U.S. Pat. No. 4,853,784, which issued Aug. 1, 1989 and which is entitled "Video Switcher with Independent Processing of Selected Video Signals," describes a switcher with several video input source signals, which are separately selectable. A selected video input signal is processed by a channel processor. It is common that a key signal, which is associated with a video input signal, will be modified during the channel processing. The channel processor then provides a processed output signal to a video combiner. The combiner combines several processor output signals as well as their modified key signals and provides a combined output signal—all in response to, and under the control of, priority signals received from an operator interface module.

Special video effects like wipes or dissolves are obtainable by adjusting values of a video input source signal. A two input switcher including a mixer can adjust the video input values (a) by multiplying, which is also called cutting in the art, a first input video signal by a mix coefficient $\alpha$; and (b) by multiplying a second input video signal by the complement of the mix coefficient, i.e. by $(1-\alpha)$; and (c) by combining by way of summing the two products. Typically, wipes and dissolves differ in the time interval over which the mix coefficient $\alpha$ changes. For example, on the one hand, if the mix coefficient $\alpha$ changes over a time interval that is much shorter than a video field interval, there typically being two fields in a frame, then the mixture is a wipe. A wipe can give a visual perception similar to that of a vertical line moving across a television screen in such a manner that an existing picture is replaced, for example, in a generally left-to-right direction by a new picture. On the other hand, if the mix coefficient $\alpha$ changes over a time interval that is equal to or longer than a video field interval then the mixture is a dissolve, which is also called a "fade" in the art. A dissolve can give a visual perception similar to that of one image replacing another image on the screen. Stated in an alternative way, in a wipe, the mix coefficient tends to differ among the different pixels that comprise the picture whereas, in a dissolve, the mix coefficient tends to be the same for all pixels that comprise the picture.

Other special video effects can be obtained by changing a priority signal. For example, in response to differing values of a priority signal, a composite video picture can be changed so that a component scene which is the foreground scene of a picture at one point in time becomes the background scene of the picture at another point in time. U.S. Pat. No. 4,758,892, which issued Jul. 19, 1988 and which is entitled "System for Producing a Video Combine from Multiple Video Images" describes a switcher including a combiner that combines two or more channels of video signals in such a way as to make scenes or images corresponding to the video signals appear to be one behind the other as in accordance with a selected priority. That combiner may result in a picture which displays a first video image from one channel of highest priority in the foreground, followed by a second video image from a second channel, which in turn is in front of, and followed by, a third video image from a third channel, etc.

U.S. Pat. No. 5,231,499, which issued Jul. 27, 1993 to the present applicant and which is entitled "Keyed, True-Transparency Image Information combine" and which is incorporated herein by reference, discloses another combiner structure that dynamically rank orders the individual input image signals; generates true transparency image key signals; and processes background key signals. Keyer units are switchably changed to produce true transparency processed key signals such that a keyer unit can modify the value of its processed key signal with the values of the input key signals in higher priority channels to generate a true transparency processed key signal for a j-th priority channel. The combiner also cuts each respective input image signal $V_i$ and background signal $V_B$ by its respective processed key signal and combines the plurality of cut signals to generate an output image combine signal $V_C$ which is usable in displaying a special video effect.

A border, or boundary, area of a picture scene can be defined by reference to the transition between one region of the picture where a key, or mix coefficient $\alpha$, has a value of one and another region where the key $\alpha$ has a value of zero. Borders, or edges, or boundaries, or transition regions, are not always that distinct. At times a transition may occur in passing from one region of a picture across a boundary to another region of the picture. For example, a border may be visually transparent, or "soft," which means that underlying parts of the picture will actually remain visible through a superimposed picture.

Unfortunately, known switchers typically produce an artifact when opaque priority elements are wiped on or off with a soft border and in particular when opaque images are visually located behind the border. Within the soft border region, an opaque element commonly becomes transparent, thereby revealing any lower priority elements, or scenes, behind it. This is optically incorrect and therefore is considered to be a problem which needs a solution. The problem arises because known switchers modify the input key signals by changing the transparency characteristic of the video signal. What results is a transparent element which was and should be an opaque element.

SUMMARY OF THE INVENTION

This and other problems are solved in accordance with the principles of the present invention, which relates to a switcher mixer architecture in which a border is introduced as though it were a separate image signal which could itself be prioritized. The mixer architecture allows special effects such as a dissolve (also known as a fade) or a wipe from one priority structure of the elements of an image scene to a completely different prioritized ordering of those same elements that comprise the image scene. The special effect can be thought of as a "priority transition." The switcher mixer architecture eliminates a soft border artifact from the special effect by allowing a border to be given its own priority as though a border were a separate video input as well as to couple together (i) a source, or "from," image having one or more elements; (ii) a destination, or "to," image having one or more elements; and (iii) a border image for separating the source image and the destination image in an image display. In that way the visual effect is that the border appears to be on top, or have a higher priority, without changing the priority of the image behind the border.

The switcher mixer includes two or more combiners, each of which receives its respective prioritized ordering of the elements that define an image from an input processor—all in response to operator commands. An output of one of the combiners (called a "from" combiner) along with its key is provided as a prioritized input to another combiner (called a "to" combiner) along with a border signal and a border key. For one special effect, the "to" combiner, in response to key signals from a wipe generator, creates special effects like a wipe. The wipes thus created have the extra advantage of eliminating the soft border transition artifact so commonly encountered with known image processors. For a second special effect, outputs from the two combiners are provided through a mixer for creating special effects like fades. For a third special effect, the priority of the elements which form the image can be changed so that one image, called a "from" image, can transition into another image, called a "to" image, and the transition can be displayed on a television screen or can be recorded, among other end uses, as a special effect.

BRIEF DESCRIPTION OF THE DRAWING

For a better understanding of the invention as well as other objects and further features thereof, reference is made in the following detailed description which is to be read in conjunction with the accompanying drawing wherein.

DETAILED DESCRIPTION

Figure 1:
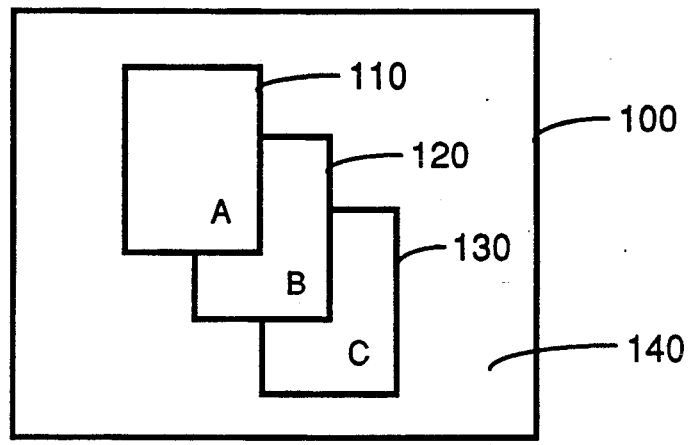
FIG. 1 is a "from" image with three scenes, which is useful in understanding the principles of my invention.

Some definitions and further background is provided before describing the details of an illustrative embodiment of the principles of my invention.

The word "from" and, as is introduced later on, the word "to" are graphic indicators which connote a source and destination, respectively. For example, the "from" image identifies the source image which is to be changed by a special effect occurring while the "to" image identifies the destination image in the sense that the "from" image is somehow modified during the occurrence of a special effect to become the "to" image. Similarly, the "from" combine is the combiner structure which combines input signals to form a "from" image while the "to" combine is the combiner structure which combines input signals to form a "to" image.

The aforesaid U.S. Pat. No. 4,758,892, which is incorporated herein by reference, teaches a combine of a generated background signal $V_B$ and a plurality of image information signals such as a plurality of video image signals $V_1, V_2, \ldots, V_N$ where N represents the number of image information signal channels. The priority of each channel in a combine can be embodied in a keyer means of a combiner to produce processed key signals in response to input key signals. Cutter means with the combiner cut the image information signals $V_i$ by the processed key signals $Pk_i$. The thusly cut image signals are extended to adder means where they are combined to form the image signal combine $V_C$.

As to producing processed keys, input key data may be supplied to a combiner. The input key data can be processed in the combiner to provide corresponding processed image key signals. Processed image key signals $Pk_i$ differ from input key signals $Bk_i$ in that the processed image key signals define the portion, or percentage, by which the image information signals from the respective channels are to be cut. In addition, on the one hand, the input key signals ($Bk_1, Bk_2, Bk_3, \ldots, Bk_N$), which may not sum to unity, have the properties that:

$$0 \leq Bk_i \leq 1, \text{ and} \\ 0 \leq Bk_1 + Bk_2 + \ldots + Bk_N \leq N \quad (1)$$

and hence the summation of $Bk_i$ over the $i=1, \ldots, N$ channels may not equal unity. On the other hand, the processed key signals ($Pk_1, Pk_2, Pk_3, \ldots, Pk_N, Pk_B$), which do sum to unity as in equation (2) below and where $Pk_B$ is a processed background key signal, have the properties that:

$$0 \leq Pk_i \leq 1, \text{ and} \\ 0 \leq Pk_B \leq 1, \text{ and} \\ Pk_1 + Pk_2 + \ldots + Pk_N + Pk_B = 1.0. \quad (2)$$

When keys are processed by the keyer means, a key for a given channel can be modified by data from any channel having a higher priority. Also the image signal of a channel may be cut in the course of generating a combine. The keyed, true-transparency image information combine that is disclosed in the aforesaid U.S. Ser. No. 07/654,127 filed Feb. 11, 1991, which is incorporated herein by reference, includes a priority processor that processes input key signals $Bk_i$ to produce processed image key signals $Pk_i$ in such a manner that the value of the input key signal $Bk_i$ in the i-th priority channel is modified by the values of the input key signals $Bk_j$ from the higher priority channels to generate a true transparency processed key signal $Pk_i$ for the i-th priority channel. The result is that the priority processor, which is embodied in the combine, embodies the following true-transparency properties:

$$Pk_1 = Bk_1 \qquad (3)$$
$$Pk_2 = Bk_2(1 - Bk_1)$$
$$Pk_3 = Bk_3(1 - Bk_2)(1 - Bk_1)$$
$$Pk_N = Bk_N \prod_{j=1}^{N} (1 - Bk_{j-1})$$
$$Pk_B = \prod_{j=1}^{N} (1 - Bk_j)$$

where $Bk_0 = 0$ and where the symbol $\pi$ is an operator, which means the mathematical product of the argument following the symbol and where it may be noted that following mathematical identity exists:

$$Pk_B = \prod_{j=1}^{N} (1 - Bk_j) = 1 - \sum_{j=1}^{N} Pk_j \qquad (4)$$

and where the image information signal combine $V_C$ is given as:

$$V_C = \sum_{i=1}^{N} PK_i V_i + PK_B V_B, \text{ or} \qquad (5)$$

$$V_C = \sum_{i=1}^{N} V_i Bk_i \prod_{j=1}^{i} (1 - Bk_{j-1}) + PK_B V_B$$

and where $V_B$ is a background signal.

We can now turn to FIG. 1. FIG. 1 illustrates a "from" image 100 with three scenes 110, 120 and 130 comprising respective symbols A, B and C as well as a background 140. The three scenes are shown in FIG. 1 as combined in such a way that a first video image A from a first channel of the highest priority is shown in scene 110 which is visually in front of scenes 120 and 130 and background (BKG) 140. Similarly, a second video image B from a second channel of the next highest priority is shown in scene 120 which is visually in front of scene 130 and background (BKG) 140 yet behind scene 110. Still similarly, a third video image C from a third channel of the next highest priority is shown in scene 130 which is visually in front of the background 140 yet behind scenes 110 and 120. Finally, the background 140 is the lowest priority.

Figure 2:
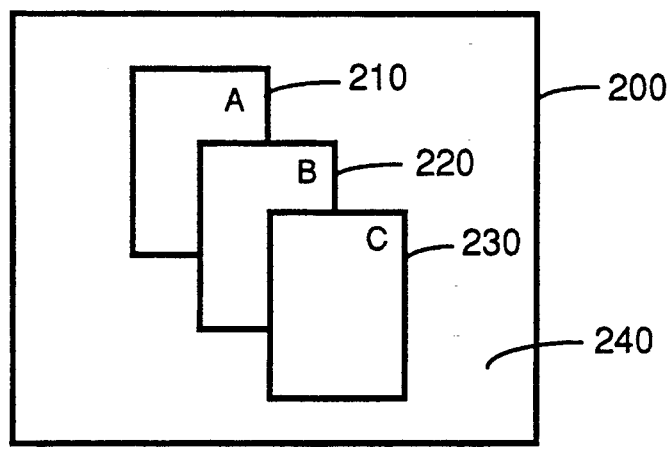
FIG. 2 is a "to" image with three scenes, which is useful in understanding the principles of my invention.

FIG. 2 illustrates a "to" image 200 with three scenes 210, 220 and 230 illustrated as comprising the respective symbols A, B and C as well as a background 240. Note that the priority of the scenes 110, 120 and 130 of FIG. 1 is now partially reversed in FIG. 2. That is, a transition in the priority of the individual scenes that comprise image 200 has been made (or a special effect has been created) which can be visualized as the "from" image 100 of FIG. 1 transitions to the "to" image 200 of FIG. 2. More particularly, the three scenes 210, 220 and 230 are shown as combined in such a way that the third video image C from the third channel of third priority in FIG. 1 is now shown in scene 230 as being in front of scenes 210 and 220 and background (BKG) 240 and hence as the first channel of the highest priority in FIG. 2. Similarly, the second video image B from the second channel of the next highest priority is shown in scene 220 which is visually in front of scene 210 and background (BKG) 240 yet behind scene 230. Still similarly, the first video image A from the highest priority channel of FIG. 1 is now the third channel of the next lower priority as shown in scene 210 which is visually in front of the background (BKG) 240 yet behind scenes 220 and 230. Finally, background 240 is the lowest priority.

A special effect is created by the transition, or change of priority, of the scenes which comprise the image. For example, the transition illustrated between FIG. 1 and FIG. 2 can be conceptualized as a change in the order of layering of the respective scenes that comprise the video image, or, in other words, as a "priority transition."

Note in FIG. 1: (a) that scene 110 is opaque with respect to scenes 120 and 130 as well as with respect to background 140 and (b) that scene 120 is opaque with respect to scene 130 and with respect to background 140 and (c) that scene 130 is opaque with respect to background 140. FIG. 2 represents a special effect generated in the transition of the "from" image 100 to the "to" image 200. Therefore note in FIG. 2 (a) that scene 230 is opaque with respect to scenes 210 and 220 as well as with respect to background 240 and (b) that scene 220 is opaque with respect to scene 210 and with respect to background 240 and (c) that scene 210 is opaque with respect to background 240. A higher priority scene is opaque with respect to a lower priority scene if the higher priority scene dominates the lower priority scene and, importantly, offers no transparent view of the lower priority scene.

Figure 3:
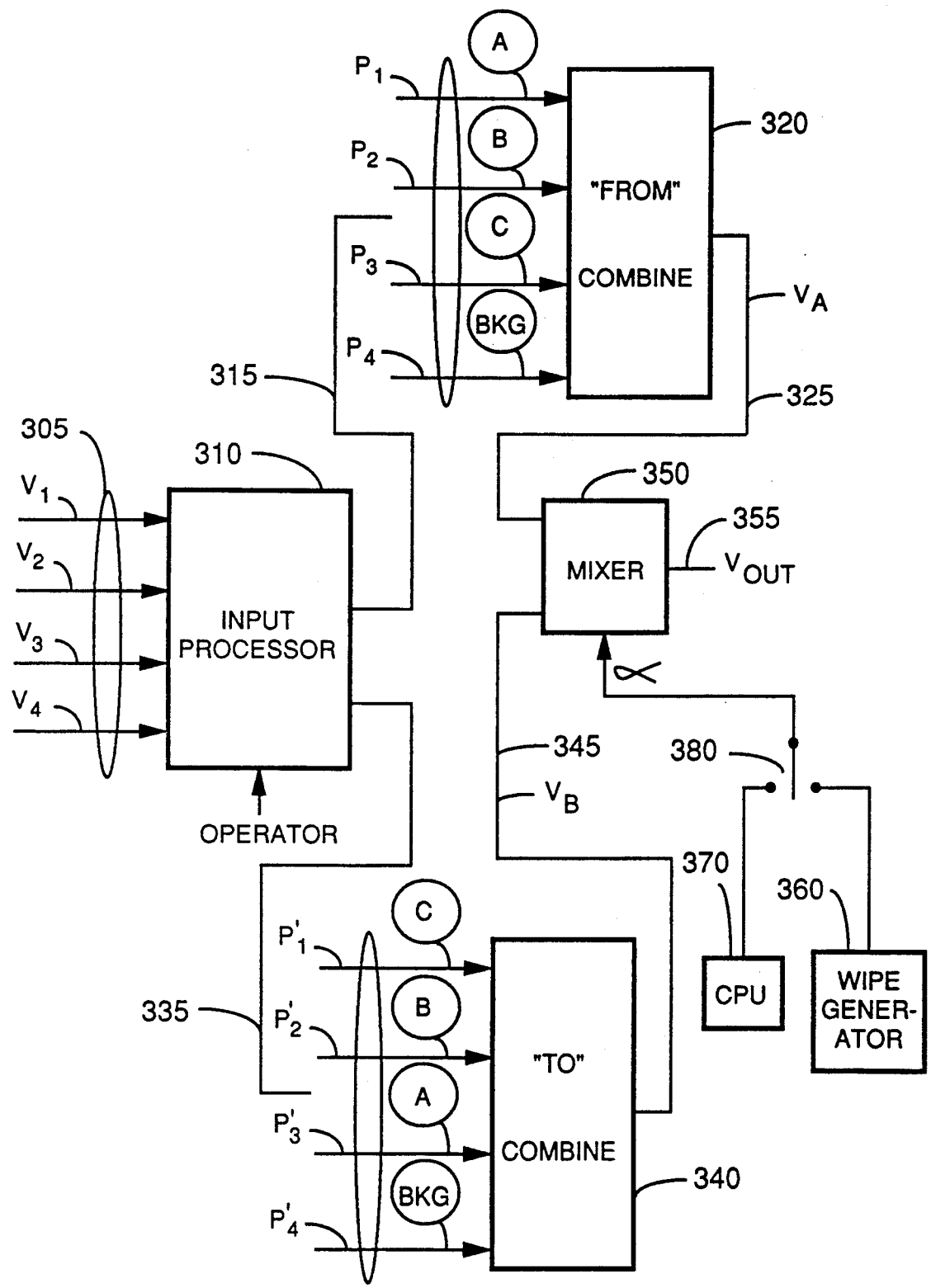
FIG. 3 is a block diagram of an image switcher mixer.

A structure which embodies the special effect created by the priority transition involving a prioritized "from" image 100 in FIG. 1 and a prioritized "to" image 200 in FIG. 2 is illustrated in FIG. 3. Referring now to FIG. 3, video input signals $V_1$, $V_2$, $V_3$, $V_4$, which could represent respectively images A, B, C plus the background from FIGS. 1 or 2, are provided over cable 305 to input processor 310.

As an aside, a video signal or an image signal typically has a key signal associated with it. In this description, it should be remembered that each video signal has a related key signal even if specific reference to a key signal is omitted from specific mention in the description.

Continuing, actually any integer number of N video input signals could be provided to input processor 310. Input processor 310 can be suitably programmed to provide the input image signals $V_1$, $V_2$, $V_3$, $V_4$ over cable 315 (with its prioritized leads $P_1$, $P_2$, $P_3$, $P_4$) and cable 335 (with its prioritized leads $P'_1$, $P'_2$, $P'_3$, $P'_4$) in a priority order that can be established in response to operator input commands. The priority inputs for the "from" combine 320 are provided over specific leads within cable 315 while the priority inputs for the "to" combine 340 are provided over specific leads within cable 335.

As an aside, the description is in terms of leads within a cable. Alternative embodiments are possible. For example, the prioritized signals could be multiplexed over a single lead. Accordingly, the description in terms of specific leads is by way of illustration only and not by way of limitation.

Continuing, an operator or even software within input processor 310 supplies instructions to input processor 310 to define a priority among the video input signals. For example, using the priority among the scenes illustrated in FIG. 1, input processor 310 provides the highest priority image A over lead $P_1$ of cable 315. Similarly, input processor 310 provides the next lower priority image B over lead P$_2$; the next lower priority image C over lead P$_3$; et cetera with the lowest priority signal (here the background) over lead P$_4$. As with the inputs to input processor 310, any integer number of N prioritized input signals V$_1$, V$_2$, V$_3$, V$_4$, ..., V$_N$ could be provided from input processor 310 over the prioritized leads P$_1$, P$_2$, ..., P$_M$ meaning that P$_1$ is the highest priority lead, P$_2$ is the next lower priority lead, etc. of cable 315 to "from" combine 320. In similar fashion, using the priority among the scenes illustrated in FIG. 2, input processor 310 provides the highest priority image C to lead P'$_1$ of cable 335. Similarly, input processor 310 provides the next lower priority image B over lead P'$_2$; the next lower priority image A to lead P'$_3$; et cetera with the lowest priority signal (here the background) on lead P'$_4$. Again any integer number of N prioritized input signals V$_1$, V$_2$, V$_3$, V$_4$, ..., V$_N$ could be provided from input processor 310 over the prioritized leads P'$_1$, P'$_2$, ..., P'$_{M'}$ meaning that P'$_1$ is the highest priority lead, P'$_2$ is the next lower priority lead, etc. of cable 335 to the "to" combine 340.

Noteworthy and as will be made clearer later on, the integers N, M and M' need not be equal. Also, some input image signals V$_i$ could be provided over prioritized leads of cables 315, 335 but have a zero value key signal associated therewith to nullify that input. Some input image signals V$_i$ could even be duplicated by being provided over more than one of the prioritized leads of cables 315, 335. Further, it is worth mentioning that a border can be provided to input processor 310 as one of its several input image signals. Also virtually any prioritized combination of input image signals V$_i$ can be provided by input processor 310 to the "from" combiner 320 or to the "to" combiner 340. And the prioritized image signals provided over cable 315 is not dependent on the prioritized image signals provided over cable 335 either in terms of specific image signals or in terms of specific priority. What must remain clear is that the flexibility possible using the principles of my invention is virtually unlimited and up to a user's or an operator's imagination in creating special effects.

The combined output signals from the "from" combine 320 and from the "to" combine 340 are extended respectively over the leads comprising cable 325 and cable 345 to mixer 350. Mixer 350 provides a mix signal output V$_{out}$ to cable 355 and therefrom to a display device such as a television monitor or to a recorder such as a video tape recorder, among other possible end uses. Standard mixer 350 provides either a fade or a wipe in response to an operator command. For example, a user may operate switch 380 to select mix coefficient α either from a CPU processor source 370 for a fade or from wipe generator 360 for a wipe. Then the mix occurs in response to movement of a fader arm, which changes the mix coefficient, to mix a first signal V$_A$, here the "from" image 100, and a second signal V$_B$, here the "to" image 200, according to a mix coefficient α, which varies between unity and zero, and the complement of the mix coefficient (1−α) in any of several well known ways:

$$V_{out} = \alpha V_A + (1-\alpha) V_B \qquad (6)$$

In that manner, input processor 310 provides, among other things, processing of transparency keys whereas mixer 350 provides the mix processing in creating a special effect like a dissolve (using processor 370 input) or a wipe (using wipe generator 360 input). It may also be noted that in response to fader arm movement the wipe generator 360 modifies the value of its mix coefficient α and supplies the modified mix coefficient to mixer 350 to effect the wipe.

Figure 4:
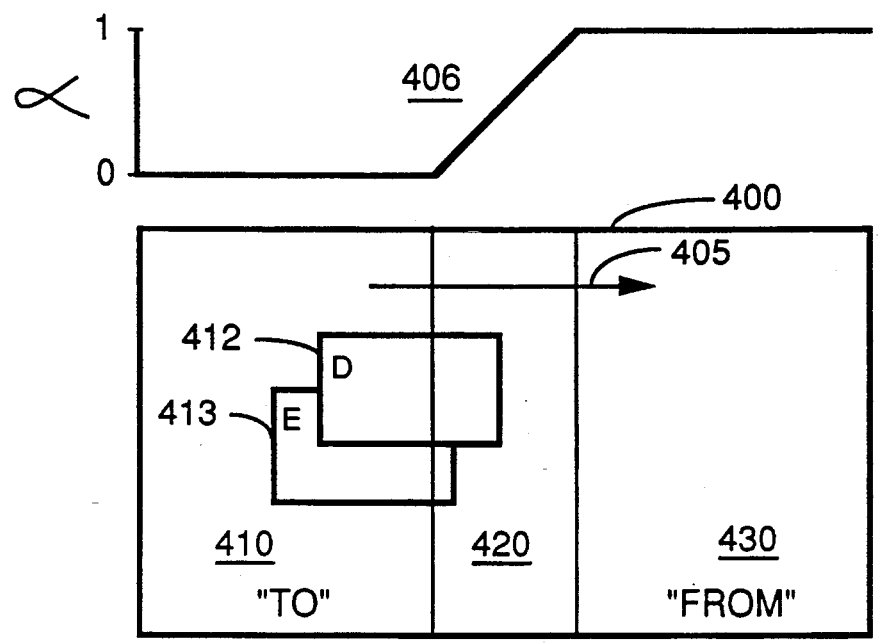
FIG. 4 illustrates a picture image that undergoes a wipe mixture with a blended transition between a "from" image and a "to" image.

Referring now to FIG. 4, there is illustrated a picture image 400 which could be provided to output video cable 355 as a mix signal output V$_{out}$ of the structure illustrated in FIG. 3. It is helpful to mentally visualize a special effect, which by the way is here assumed to be a wipe, that commences with the "from" image 430 being the entire image 400, i.e. image 400 is devoid of any "to" image 410 and only consists of the "from" image 430. In other words, the mix coefficient α of equation (6) has a value of unity as noted on scale 406. Now mentally picture that a wipe is to occur in a generally left-to-right direction 405. (Of course, wipes can occur in any direction and be of any shape.) As the fader arm of mixer 350 is moved, the mix coefficient α that is shown on scale 406 decreases from unity toward zero in the transition region, or border, 420 located between the "from" image 430, which is displayed in the right plane of image 400, and the "to" image 410, which is displayed in the left plane of image 400. Then, when the mix coefficient α becomes zero, the "to" image 410 with its scene 412 having symbol D and with its scene 413 having symbol E becomes visible. If scene 412 is assumed to be opaque with respect to scene 413, then it would be expected that scene 412 would appear in front of scene 413 and there would be no transparency of scene 412. If there is a priority transition between "from" image 430 and "to" image 410, then scene 412 having symbol D and scene 413 having symbol E located in the "to" image 410 would have a change in their priority relationship with respect to the scenes containing those symbols in the "from" image 430 and would also have replaced similar scenes located in the "from" image 430 as the border 420 is wiped across the screen in the generally left-to-right direction 405.

In the above discussion, it may be noted that the transition region, or border, 420 would display a combined image having a blended display as the "from" image 430 blends into the "to" image 410 in a proportion determined by equation (6) during the time that border 420 is wiped across the screen. It is also worth mentioning that a border can be separately generated by input processor 310 or provided to input processor 310 as one of its several input image signals.

In the following discussion, let us focus on a fade illustrated by FIG. 5 rather than the wipe illustrated by FIG. 4—both being achievable using the structure of FIG. 3.

Figure 5:
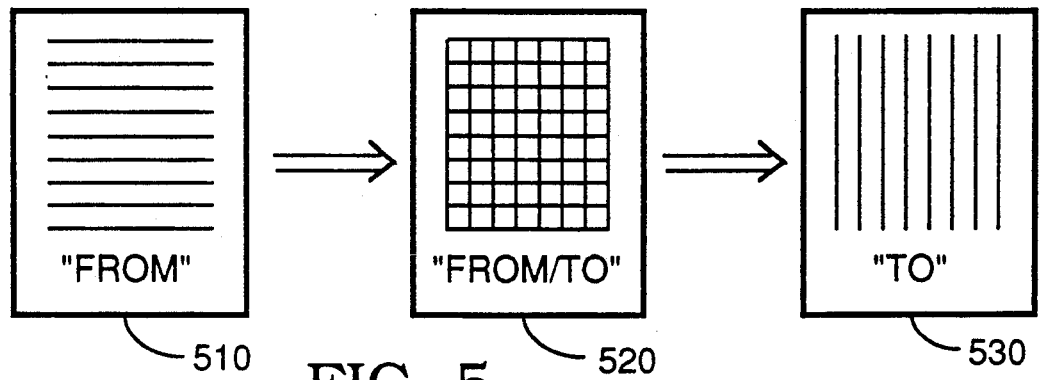
FIG. 5 illustrates a picture image that undergoes a fade mixture between a "from" image and a "to" image.

In FIG. 5, the "from" image 510 is shown with several horizontal lines whereas the "to" image 530 is shown with several vertical lines. With the fader arm of mixer 355 in a position to provide a mix coefficient of unity, then the "from" image 510 is displayed. As the fader arm of mixer 355 is moved, the mix coefficient α takes on values less than unity. As noted from equation (6) the value of the mix coefficient α corresponds to the relative proportion that the "from" image 510 contributes to the displayed image 520. Accordingly, there is displayed, as is shown in 520, a portion of horizontal lines and a portion of vertical lines corresponding to the proportion of the "from" and the "to" images that is represented by the mix coefficient α. As the fader arm reaches an opposite end, the mix coefficient becomes zero and the "to" image 530 is displayed. In that manner, the displayed image fades, or dissolves, from one scene (here scene 510) to another scene (here scene 530), and vice versa.

Figure 6:
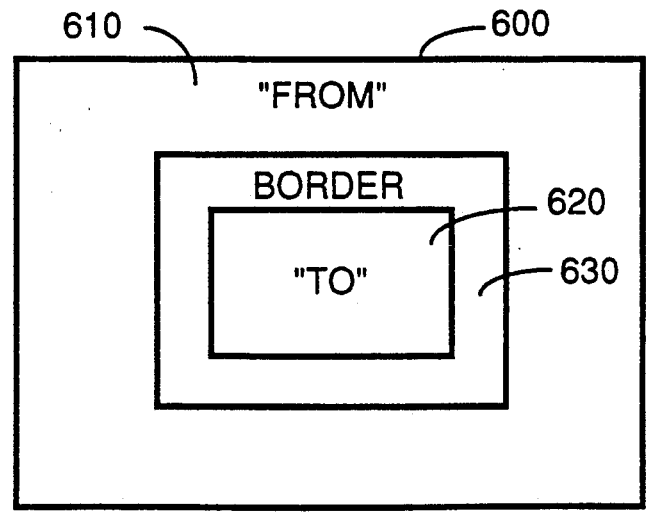
FIG. 6 illustrates a picture image that undergoes a wipe mixture, which is somewhat more complicated than the wipe mixture of FIG. 4.
Figure 7A:
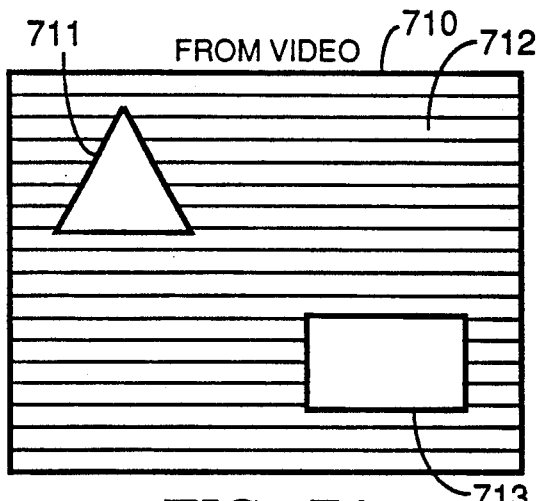
FIGS. 7A-7E illustrate a picture image that undergoes a wipe mixture, which involves a transition between a "from" image and a "to" image when coupled with a border that is somewhat more complicated than the wipe mixture of FIG. 4.
Figure 7B:
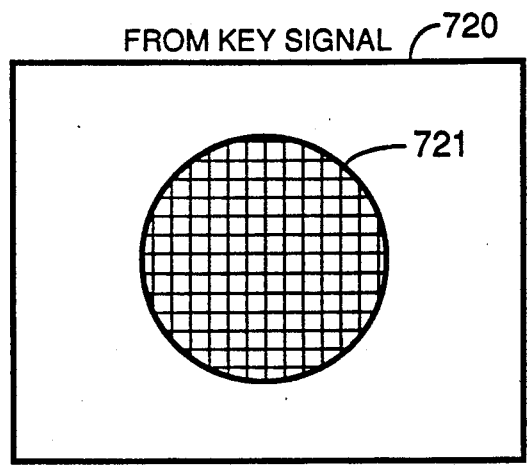
Figure 7C:
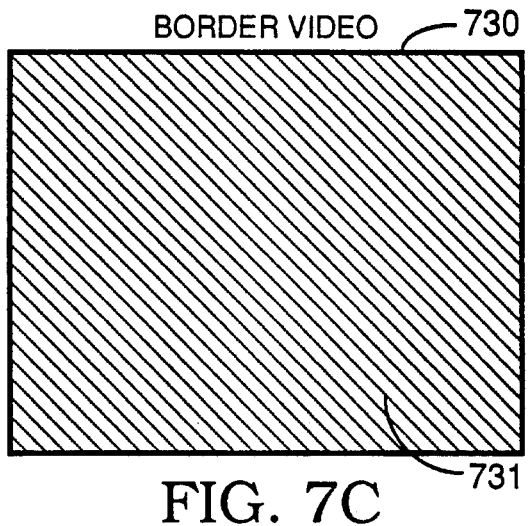
Figure 7D:
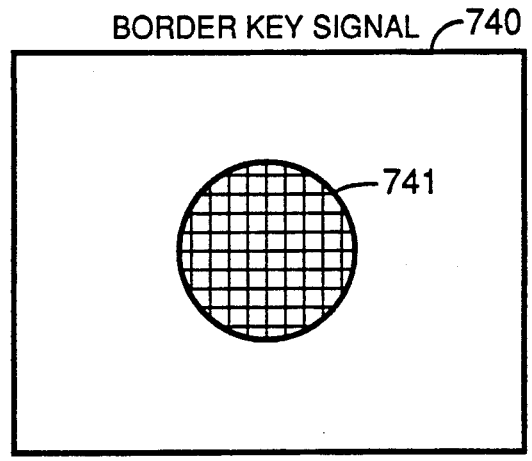
Figure 7E:
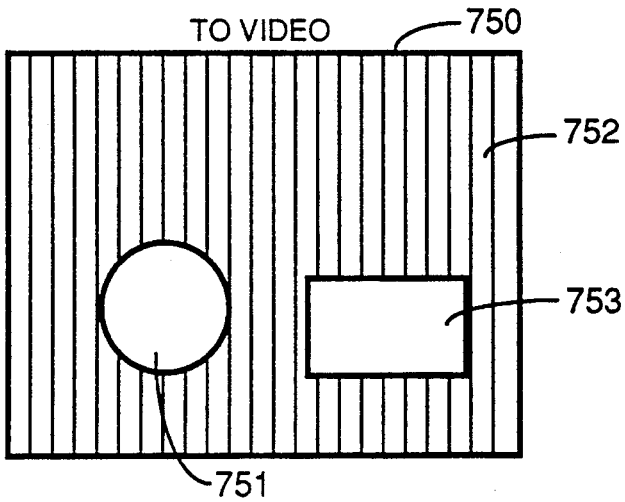

Referring now to FIG. 6, there is illustrated a picture image 600 which is slightly more complex than the picture image 400 illustrated in FIG. 4. It is helpful to mentally visualize a special effect that commences with the "from" image 610 being the entire image 600, i.e. image 600 is devoid of any "to" image and only consists of the "from" image. In other words, the mix coefficient α of equation (6) has a value of unity for all pixels that comprise image 600. Then we can visualize that the fader arm of mixer 350 is moved so that a wipe, rather than a fade, occurs. With a wipe, the mix coefficient α is typically adjusted on a pixel-by-pixel basis in response to a movement of the fader arm. Accordingly, if the "to" image 620 is generally visible at the center of image 600, then the mixture coefficient is adjusted corresponding to the contribution that the "to" image 620 makes to the picture image 600. FIG. 6 illustrates picture image 600 being shown as a mixture of a "from" image 610 and a "to" image 620. Eventually, as mix coefficient α reduces in value to zero, then the "to" image 620 becomes the entire image 600. Of course, the inverse could happen as the mix coefficient increases from zero to unity. In either event, mix coefficient α is modified as the fader arm of mixer 350 is moved so that, in this example, picture 600 transitions (a) from showing only "from" image 610; (b) to showing a combination of both "from" image 610 and "to" image 620; (c) to showing only "to" image 620—much like with FIG. 4.

Of course, a dissolve could also occur. However, FIGS. 4 and 6 illustrate wipes rather than dissolves. A dissolve is earlier described with the aid of FIG. 5.

One other aspect of FIG. 6 now deserves discussion and that aspect is border 630, which is shown as surrounding the "to" image 620 and as separating the "from" image 610 apart from the "to" image 620. Borders present certain problems in creating special effects and it is toward solving those problems that the principles of my invention are directed. For example, present day switchers typically produce an artifact when opaque priority elements are wiped on or off with a soft border. Within the soft border region, an opaque element commonly becomes transparent, thereby revealing any lower priority elements, or scenes, behind it. That effect is optically inaccurate and therefore is considered to be a problem which needs a solution.

Figure 8:
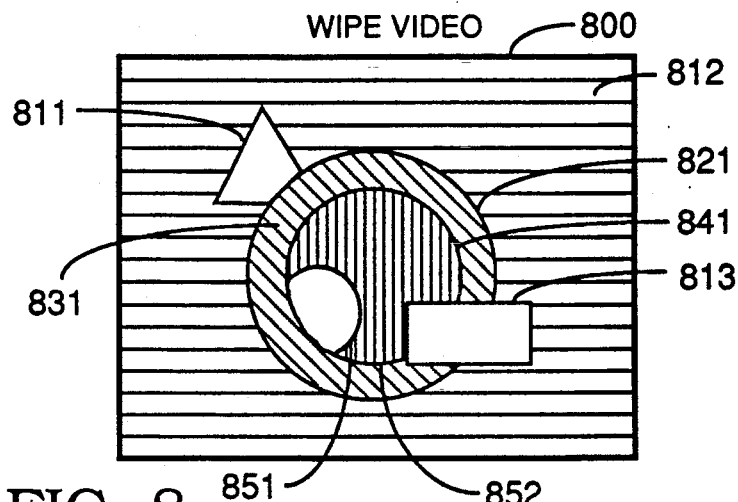
FIG. 8 illustrates the picture image after the wipe mixture of FIG. 7.
Figure 9:
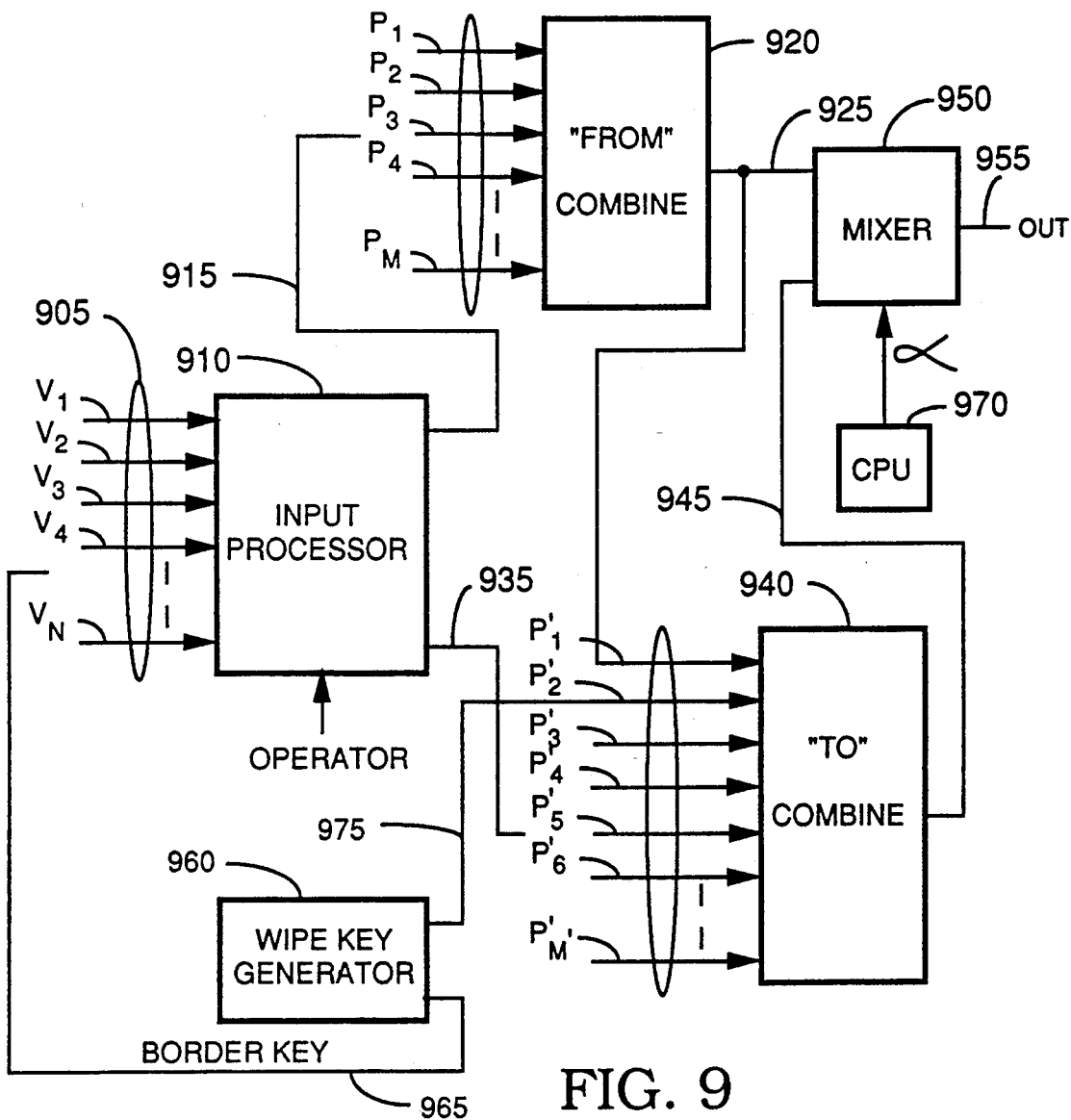
FIG. 9 is a block diagram of an image mixer using the principles of my invention for creating special effects like those illustrated in FIGS. 4-8.

To further understand the already described solution, the following discussion relies on the structure illustrated in FIG. 9 rather than the structure illustrated in FIG. 3 and discusses that structure in connection with the special effect reflected in FIGS. 7 and 8. Some differences are worth mentioning before the discussion begins.

First, mixer 355 of FIG. 3 is usable for both dissolves and wipes whereas mixer 950, which receives a first input from the "from" combine 920 over cable 925 and a second input from the "to" combine 940 over cable 945 in FIG. 9, is usable in conjunction with CPU processor 970 for dissolves. Wipes use wipe key generator 960 for providing a border key over cable 965 to input processor 910 where the border is also prioritized as an input of "to" combiner 940. It is worth mentioning that a border can be generated by or provided to input processor 910 as one of its several input image signals.

Second, an output of "from" combiner 920 is provided over cable 925 to a prioritized input of "to" combiner 940. Here the output of 920 is shown at prioritized input $P'_1$ of 940. Clearly, it could be assigned to another of the priority inputs of "to" combiner 940. Also, wipe key generator 960 provides a "from" key over cable 975 to a prioritized input of "to" combiner 940. Here the output on cable 975 is shown at prioritized input $P'_2$ of 940. Clearly, it could be assigned to another of the priority inputs of "to" combiner 940. In that manner, the priority of the "from" image relative to the "to" image becomes defined.

In view of the structure of FIG. 9, it ought now to be clear how the special effect of priority transition occurs as well as how that structure eliminates images becoming transparent during the special effect of a soft border wipe. Part of the solution of solving the transparency problem that typically occurs with soft border wipes is to move elements of the wipe function from the mixer 350 of FIG. 3 to the wipe key generator 960 and the "to" combine 940 of FIG. 9.

Now refer to FIG. 7 where several signals and video images are illustrated for processing by the structure of FIG. 9 in order to create certain special effects and in order to avoid the transparency problem—all of which can be done using the principles of my invention. Specifically, FIG. 7 shows:

(a) a "from" video 710 comprising a triangular shape 711, several horizontal lines 712 and a rectangle shape 713;

(b) a "from" key signal 720 having a circular shape 721 indicating a desire to exclude video on the interior of circle 721 but to include video on the exterior of the circle 721 (and yet within key 720);

(c) a border video 730 generated by, or otherwise provided by, input processor 910 and here shown as comprising several cross hatched lines 731;

(d) a border key signal 740 having a circular shape 741 indicating a desire to exclude video on the interior of circle 741 but to include video on the exterior of the circle 741 (and yet within key 740). It can be noted that the diameter of circle 721 is assumed to be slightly larger than the diameter of circle 741; and (e) a "to" video 750 comprising a circular shape 751, several vertical lines 752 and a rectangle shape 753.

Some observations are now in order. The image input signals to input processor 910 (like 310) can be several image input signals including triangular shape 711, several horizontal lines 712, rectangle shape 713, border video cross hatched lines 731, a circular shape 751, several vertical lines 752 and a rectangle shape 753.

Responsive to operator commands, input processor 910 prioritizes those ones of the input signals which form the "from" image 710 and also prioritizes those ones of the input signals which form the "to" image 750. It is not necessary that all input signals be extended to both "from" combine 920 and "to" combine 940 although that could occur in which event the unnecessary input signals may have a zero key signal associated therewith. Recall as mentioned earlier that each image signal has a key signal associated therewith. In that connection, note that a "to" key signal is not explicitly shown on FIG. 7. That is because the remainder of the key available to satisfy the properties of equation (2) can be used as the "to" key.

In this example, input processor 910 can prioritize triangular shape 711, several horizontal lines 712, and rectangle shape 713 and provide those input signals over the priority leads of cable 915 to "from" combiner 920, which combines those input signals as shown as the "from" video 710 that appears at "from" combiner output 925. Also, input processor 910 can prioritize the circular shape 751, several vertical lines 752 and the rectangle shape 753 and provide those input signals over cable 935 to the "to" combiner 940, which combines those input signals as shown as the "to" video 750, as well as "from" combiner output 925 and border video cross hatched lines 731, which also are provided from input processor 910. Notice that rectangle shapes 713 and 753 are the same shape and same location in the "from" image 710 and in the "to" image 750. Accordingly, although two rectangle shaped signals are shown, only one such rectangle shape signal need be provided to input processor 910. Also, as mentioned earlier, each video signal has a key signal. In the case of the wipe special effect being illustrated, "from" video 710 has a "from" key signal 720 (here circle 721 is of interest) while border video 730 has a border key signal 740 (here circle 741 is of interest). "From" key signal 720 and border key signal 740 are provided respectively over cables 975 and 965 from wipe key generator 960 to respectively one priority input of "to" combine 940 and, through input processor 910, to another priority input of "to" combine 940. Also note that each of the circular shape 751, several vertical lines 752 and the rectangle shape 753 has an associated key signal. That being the case the background of the "to" video has a key that has a value that uses the remainder of the key available which would then satisfy equation (2).

Referring now to FIG. 8, the wiped video 800 that is there shown is a somewhat complicated combination of the elements of FIG. 7. Note first that a border 831 includes some border video cross hatched lines 731 and that the border is formed as the circular difference in diameters between larger diameter circle shape 721 (shown as 821) and smaller diameter circle shape 741 (shown as 841). Rectangle shape 813, which as mentioned is really rectangle shapes 713 and 753, is unchanged because both the "from" image 710 and the "to" image 750 have the same rectangle located at the same location of the display. Note that by prioritizing the rectangle shape to have a higher priority than the border in the prioritized input of the "to" combine 940 (e.g. the rectangle shape is assigned a priority $P'_i$ while the border is assigned a priority $P'_j$ where i is less than j) then optically, rectangle shape 813 dominates over the border 831. Portions of triangle shape 711 (shown as 811), horizontal lines 712 (shown as 812), circle 751 (shown as 851), and vertical lines 752 (shown as 852) all appear in the wipe video 800 illustrated in FIG. 8—albeit cut by the respective key of the "from" video 710 and border video 730.

The structure of FIG. 9, which parallels the structure of FIG. 3, includes an output of "from" combine 920 being provided to a high priority input, like $P'_1$ of the "to" combine 940 and further by having a border key output of wipe key generator 960 being provided over cable 965 to another input of input processor 910. Under operator control, processor 910 in prioritizing the video inputs 905 can also prioritize the border key signal on cable 965 and extend it over cable 935 to "to" combine 940. In that manner the "to" image input to the "to" combine 940 has both the "from" image and the border signal prioritized so that the border signal can dominate and remain opaque with respect to the "to" image even though the key signals of the various input video signals are altered.

Accordingly, while there have been shown and described above various alternative embodiments of systems and methods of operation for the purpose of enabling a person of ordinary skill in the art to make and use the invention, it should be appreciated that the invention is not limited thereto. Accordingly, any modifications, variations or equivalent arrangements within the scope of the attached claims should be considered to be within the scope of the invention.

What is claimed is:

1. A method for creating a special image effect, the method comprising the steps of:
   receiving a plurality of input image signals;
   prioritizing the input image signals according to a first priority;
   combining the first prioritized ordering of the input signals;
   prioritizing the input image signals and the combined first prioritized ordering of the input signals according to a second priority;
   combining the second prioritized ordering of the input signals; and
   mixing the combined first prioritized ordering of the input signals with the combined second prioritized ordering of the input signals.

2. The method defined by claim 1 further comprising the steps of:
   generating a border signal;
   adjusting the second priority of signals to include the prioritizing of the border signal in the second prioritized ordering of the input signals.

3. The method defined by claim 1 wherein one of the received plurality of input image signals is a border signal and wherein the step of prioritizing the input image signals and the combined first prioritized ordering of the input signals according to a second priority further comprises the step of:
   adjusting the second priority of signals to include the prioritizing of the border signal in the second prioritized ordering of the input signals.

4. The method defined in claim 3 further comprising the steps of:
   generating a border key for a special effect; and
   providing the border key in association with the border signal.

5. The method defined in claim 1 further comprising the step of:
   eliminating a soft border artifact from the special image effect.

6. Apparatus for creating a special effect, the apparatus comprising:
   an input processor for receiving input image signals, the image signals to be processed to provide a special effect, the input processor responsive to operator initiated commands for providing a plurality of prioritized orderings of the input image signals;
   a plurality of combiner means, each combiner means being coupled to the input processor so that a respective combiner means receives a respective prioritized ordering of the input image signals and each combiner means being adapted to combine its respective prioritized ordering of the input image signals and each combiner means being adapted to provide a combined output;
   means for receiving a combined output from the plurality of combiner means, the means for receiving a combined output from the plurality of combiner means including means in response to a combined output from at least one combiner means for modifying the prioritized ordering of the input image signals of at least one other combiners means;

means for mixing the plurality of combined outputs in response to operator initiated commands; and means for combining the mixed outputs as a special effect.

7. The apparatus defined in claim 6 wherein the means for combining the mixed outputs as a special effect includes means for creating a wipe.

8. The apparatus defined in claim 6 wherein the means for combining the mixed outputs as a special effect includes means for creating a dissolve.

9. The apparatus defined in claim 6 wherein the input processor for receiving input image signals is adapted to receive a border key in association with a border input image signal.

10. The apparatus defined in claim 6 further comprising:

means for eliminating a soft border artifact from the special effect.

* * * * *